(12) United States Patent
Lehtimaki

(10) Patent No.: US 12,425,271 B1
(45) Date of Patent: Sep. 23, 2025

(54) EFFICIENT RANGING ALGORITHM FOR HIGH ACCURACY DISTANCE MEASUREMENTS

(71) Applicant: Silicon Laboratories Inc., Austin, TX (US)

(72) Inventor: Sauli Lehtimaki, Nummela (FI)

(73) Assignee: Silicon Laboratories Inc., Austin, TX (US)

( * ) Notice: Subject to any disclaimer, the term of this patent is extended or adjusted under 35 U.S.C. 154(b) by 53 days.

(21) Appl. No.: 18/597,214

(22) Filed: Mar. 6, 2024

(51) Int. Cl.
*H04L 25/02* (2006.01)

(52) U.S. Cl.
CPC ........ *H04L 25/022* (2013.01); *H04L 25/0204* (2013.01); *H04L 25/0224* (2013.01)

(58) Field of Classification Search
CPC ............... H04L 25/0204; H04L 25/022; H04L 25/0224
See application file for complete search history.

(56) References Cited

U.S. PATENT DOCUMENTS

| 11,444,627 B1* | 9/2022 | Srinivasan | G06F 1/08 |
| 2016/0227368 A1* | 8/2016 | Sanderovich | G01S 11/06 |
| 2019/0320408 A1* | 10/2019 | Opshaug | H04W 64/003 |
| 2024/0022887 A1* | 1/2024 | Wulff | H04W 8/005 |

OTHER PUBLICATIONS

Bluetooth SIG, Inc., Channel Sounding, pp. 21-23, Section 3.1.9-3.1.11; Jun. 2023.
Tepedelenlioglu et al., The Ricean K Factor: Estimation and Performance Analysis. IEEE Transactions on Wireless Communications. vol. 2, No. 4, pp. 799-810, Jul. 2003.

* cited by examiner

*Primary Examiner* — David B Lugo
(74) *Attorney, Agent, or Firm* — Nields, Lemack & Frame, LLC

(57) ABSTRACT

A system and method for determining the distance between two wireless network devices is disclosed. The present system utilizes an algorithm that relies on the power ratio between the trial signal power and the remaining signal power. Remaining signal power is defined as the power that is left after subtracting the trial signal power from the total signal power. This algorithm computes the channel frequency response and uses the phase signal at each frequency and distance to calculate the line of sight distance between two wireless network devices. This approach does not rely on eigenvectors or any prior estimate of the number of signals, and can therefore be computed quickly and efficiently.

20 Claims, 5 Drawing Sheets

```
// H is the measured complex channel frequency response

// ch_list is the list of Bluetooth channels for which the channel frequency response has been measured max_distance = 150 // typical max value x_step = 0.05 // in this example, the power ratio is measured every 5 cm H_power = mean(pow(abs(H),2)) // power is the mean value of the absolute value of channel response squared; all operations are point wise H_length = length(H) // this is number of frequencies that were measured previous_power_ratio= 0 //this is previous power ratio first_peak_not_found = TRUE //no peak found yet x_arg = 0 // start at a distance of 0 while (x_arg<=max_distance and first_peak_not_found)
        for k = 1 to H_length
                ch = ch_list[k] //get next frequency from list
                D=exp(i*2*pi*ch*1e6*x_arg/speed_of_light) // compute signal path phase
                V[k]=D*H[k] //calculate de-rotated frequency response, which is angular rotation of
                            complex exponential
        end
        power_trialsignal = pow(abs(mean(V)),2) //calculate mean power for trial signal
        power_ratio = power_trialsignal/(H_power-power_trialsignal) // computer power ratio //Now check if peak was found
        if (power_ratio<previous_power_ratio)
                // peak was found, as value is decreasing
                first_peak_not_found=FALSE
                final_distance = x_arg-x_step //previous value was the peak
        else
                previous_power_ratio=power_ratio // no peak yet
        end x_arg=x_arg + x_step // move on to next distance and repeat
end
```

FIG. 4

EFFICIENT RANGING ALGORITHM FOR HIGH ACCURACY DISTANCE MEASUREMENTS

FIELD

This disclosure describes systems and methods for determining the distance between two wireless network devices, and specifically, using a new ranging algorithm to determine this distance.

BACKGROUND

The Bluetooth protocol has designed several techniques to implement high accuracy distance measurement (HADM). These include a phase based ranging approach and a round trip time approach. Typically, there are two devices associated with these approaches; an initiator device that initiates the distance measurement and a reflector device, which responds to the initiator device. The distance being measured is the distance between these two devices.

In the round trip time (RTT) approach, each device uses timestamps. Specifically, when a packet is transmitted, the transmitting device records a transmit timestamp. When that packet arrives, a receive timestamp is used by the receiving device.

In the phase based approach, the initiator device determines the incoming phase for signals transmitted at two different frequencies. The phase measured ($\theta_{init}$) at the initiator device may be approximately the difference in phase between the two devices (i.e. $\Delta\theta_{ir}$), added to the product $2\pi * f * (tp)$, where f is the frequency of the transmitted signal and tp is the trip delay. If this phase is measured at two different frequencies, and the difference is taken, the result is $(\theta_{init1}) - (\theta_{init2}) = 2\pi * f1 * (tp) - 2\pi * f2 * (tp)$, or $2*\pi*(f1-f2)*(tp)$. Based on this equation, the trip delay may be calculated and then converted to a distance. This approach may be enhanced through the use of the multiple signal classification (MUSIC) algorithm. The MUSIC algorithm uses this information to generate pseudo-spectrums which may be used to determine the distance between the two devices.

However, these existing algorithms have limitations. For example, the MUSIC algorithm is very computation and memory intensive, which may be problematic for certain devices. Further, the algorithm may also be time consuming, making it difficult to use this algorithm for measuring moving devices.

Consequently, an improved system and method would be beneficial. Further, it would be advantageous if the improved system did not require a large amount of computational processing.

SUMMARY

A system and method for determining the distance between two wireless network devices is disclosed. The present system utilizes an algorithm that relies on power ratio. The power ratio may be calculated as the ratio of the trial signal power to the remaining signal power. Trial signal power is defined as the signal power associated with a particular distance, while the remaining signal power is defined as the power that is left after subtracting the trial signal power from the total signal power. This algorithm computes the channel frequency response and uses the phase signal at each frequency and distance to calculate the line of sight distance between two wireless network devices. This approach does not rely on eigenvectors or any prior estimate of the number of signals, and can therefore be computed quickly and efficiently.

According to one embodiment, a method of calculating a distance between two wireless network devices is disclosed. The method comprises performing a Channel Sounding procedure at a plurality of frequencies to obtain a channel frequency response; using the channel frequency response to generate a power ratio as a function of distance, wherein power ratio is defined as trial signal power divided by remaining power; and identifying a first peak in the power ratio as the distance between the two wireless network devices. In some embodiments, the remaining power is calculated by subtracting the trial signal power at a first distance from a power of the channel frequency response. In certain embodiments, the trial signal power at the first distance is first calculated by de-rotating a phase of the signal path at the first distance from the channel frequency response to obtain a de-rotated frequency response. In certain embodiments, the trial signal power at the first distance is computed by squaring an absolute mean value of the de-rotated frequency response at the plurality of frequencies. In certain embodiments, the power of the channel frequency response is calculated as a mean of an absolute value of the channel frequency response at each of the plurality of frequencies, squared. In some embodiments, the two wireless network devices comprise Bluetooth network devices. In certain embodiments, the plurality of frequencies comprise all frequencies associated with Bluetooth channels. In certain embodiments, the plurality of frequencies comprise all frequencies associated with Bluetooth channels, except advertising channels. In some embodiments, the power ratio is calculated at a plurality of distances and the first peak is defined as a peak having a magnitude greater than a threshold at a smallest distance.

According to another embodiment, a Bluetooth network is disclosed. The Bluetooth network comprises a reflector device; and an initiator device, comprising: a Bluetooth network interface; a processing unit; and a memory device, wherein the memory device comprises instructions, which when executed by the processing unit, enable the initiator device to: calculate a channel frequency response at a plurality of frequencies; use the channel frequency response to generate a power ratio as a function of distance, wherein power ratio is defined as trial signal power divided by remaining power; and identify a distance between the reflector device and the initiator device as a first peak in the power ratio. In some embodiments, the remaining power is calculated by the initiator device by subtracting the trial signal power at a first distance from a power of the channel frequency response. In certain embodiments, the trial signal power at the first distance is first calculated by the initiator device by de-rotating a phase of the signal path at the first distance from the channel frequency response to obtain a de-rotated frequency response. In certain embodiments, the trial signal power at the first distance is computed by the initiator device by squaring a mean value of the de-rotated frequency response at the plurality of frequencies. In some embodiments, the power of the channel frequency response is calculated by the initiator device as a mean of an absolute value of the channel frequency response at each of the plurality of frequencies, squared. In some embodiments, the plurality of frequencies comprise all frequencies associated with Bluetooth channels or wherein the plurality of frequencies comprise all frequencies associated with Bluetooth channels, except advertising channels. In some embodiments, the initiator device calculates the power ratio at a plurality of distances and the first peak is defined as a peak having a magnitude greater than a threshold at a smallest distance.

According to another embodiment, a method of calculating a distance between two wireless network devices is disclosed. The method comprises performing a Channel Sounding procedure at a plurality of frequencies to obtain a channel frequency response; using the channel frequency response to generate a power ratio as a function of distance, wherein power ratio is defined as trial signal power divided by a constant; and identifying a first peak in the power ratio as the distance between the two wireless network devices. In some embodiments, the trial signal power at a first distance is first calculated by de-rotating a phase of the signal path at the first distance from the channel frequency response to obtain a de-rotated frequency response, and then squaring an absolute mean value of the de-rotated frequency response at the plurality of frequencies. In some embodiments, the constant is the power of the channel frequency response, and the power of the channel frequency response is calculated as a mean of an absolute value of the channel frequency response at each of the plurality of frequencies, squared. In some embodiments, the constant is 1. In some embodiments, the power ratio is calculated at a plurality of distances and the first peak is defined as a peak having a magnitude greater than a threshold at a smallest distance.

BRIEF DESCRIPTION OF THE DRAWINGS

For a better understanding of the present disclosure, reference is made to the accompanying drawings, in which like elements are referenced with like numerals, and in which:

FIG. 4 shows pseudo code used to calculate the power ratio and first peak;

DETAILED DESCRIPTION

Figure 1:
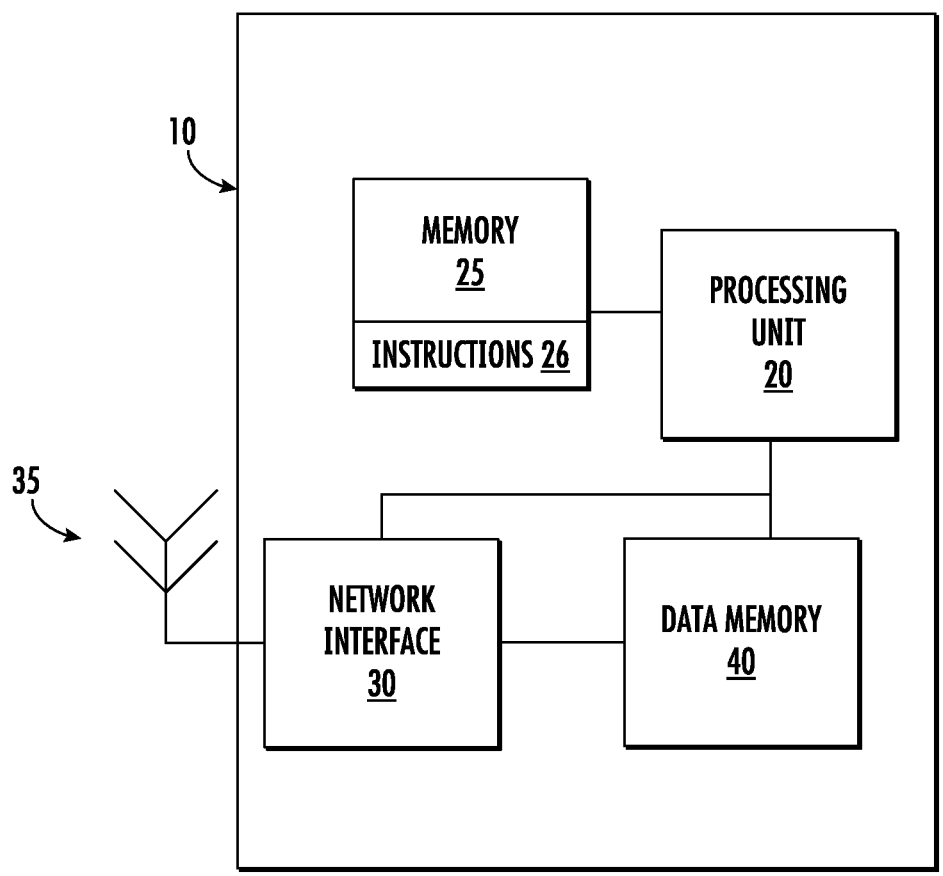
FIG. 1 is a block diagram of a representative initiator device that may estimate distance according to one embodiment.

FIG. 1 shows a block diagram of a representative network device. This network device may serve as an initiator device 10, as described in more detail below. This network device may also be used to determine the distance to a remote device, also referred to as a reflector device.

The initiator device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the initiator device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The initiator device 10 also includes a network interface 30, which may be a wireless interface including an antenna element 35.

The wireless signals first enter the network interface 30 through antenna element 35. The antenna element 35 is in electrical communication with a low noise amplifier (LNA). The LNA receives a very weak signal from the antenna element 35 and amplifies that signal while maintaining the signal-to-noise ratio (SNR) of the incoming signal. The amplified signal is then passed to a mixer. The mixer is also in communication with a local oscillator, which provides two phases to the mixer. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer are then fed into programmable gain amplifier (PGA). The PGA amplifies the $I_m$ and $Q_m$ signals by a programmable amount. These amplified signals may be referred to as $I_g$ and $Q_g$. The amplified signals, $I_g$ and $Q_g$, are then fed from the PGA into an analog to digital converter (ADC). The ADC converts these analog signals to digital signals, $I_d$ and $Q_d$. These digital signals may then pass through a channel filter. The filtered signals are referred to as I and Q. These I and Q signals can be used to recreate the amplitude and phase of the original signal.

The network interface 30 may support any wireless network, such as Bluetooth, Wi-Fi, networks utilizing the IEEE 802.15.4 specification, such as Zigbee, networks utilizing the IEEE 802.15.6 specification, and wireless smart home protocols, such as Z-Wave. The network interface 30 is used to allow the locator device to communicate with other devices disposed on the network.

The initiator device 10 may include a data memory device 40 in which data that is received and transmitted by the network interface 30 is stored. This data memory device 40 is traditionally a volatile memory. The processing unit 20 has the ability to read and write the data memory device 40 so as to communicate with the other nodes in the network. Although not shown, the initiator device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions 26 may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the initiator device 10. The instructions contained on this second computer readable media may be downloaded onto the memory device 25 to allow execution of the instructions by the initiator device 10.

While the processing unit 20, the memory device 25, the network interface 30, and the data memory device 40 are shown in FIG. 1 as separate components, it is understood that some or all of these components may be integrated into a single electronic component. Rather, FIG. 1 is used to illustrate the functionality of the initiator device 10, not its physical configuration.

Figure 2:
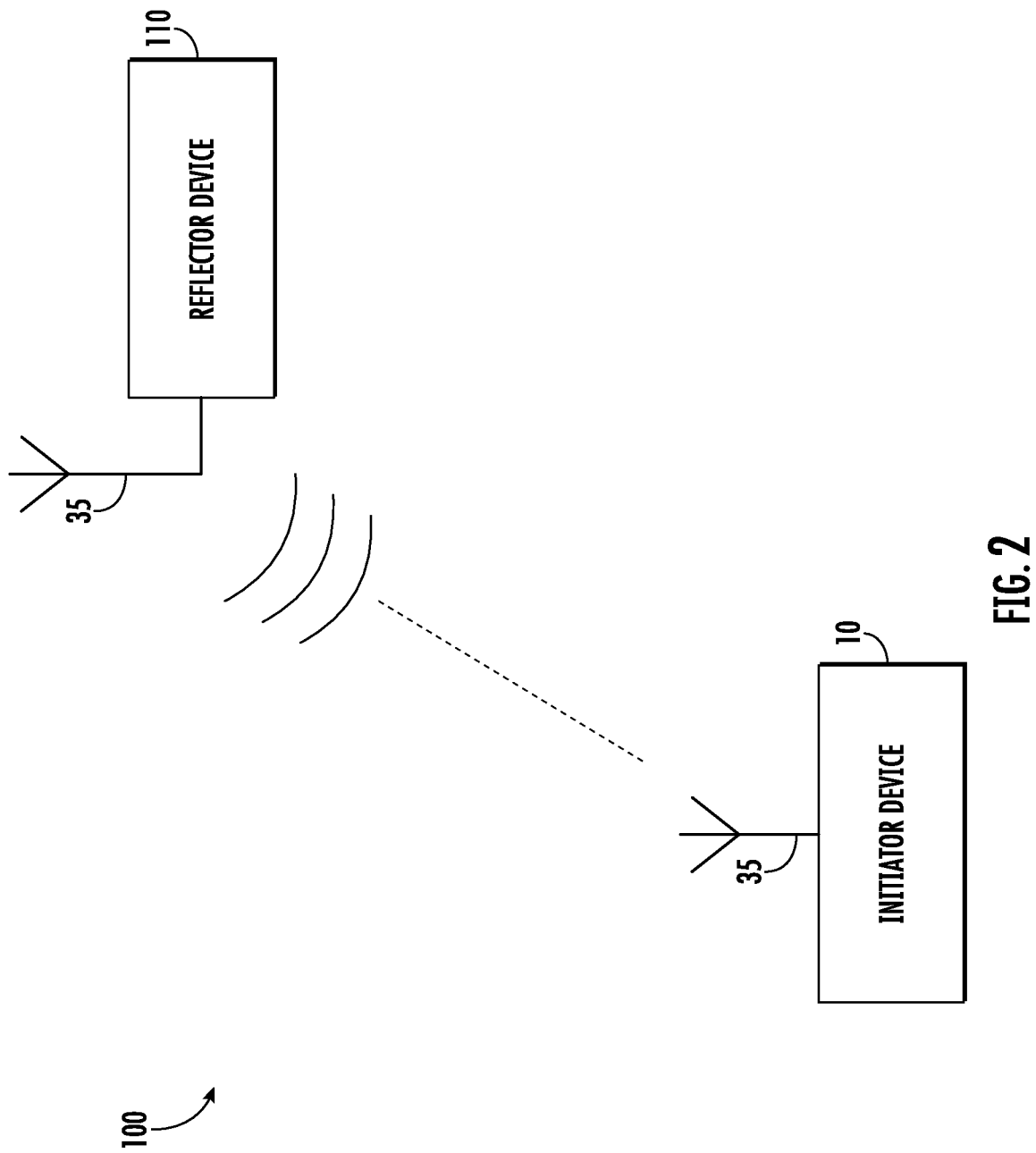
FIG. 2 shows a network having an initiator device and at least one reflector device according to one embodiment.

FIG. 2 shows a network 100 having at least one reflector device 110 and an initiator device 10. In certain embodiments, the reflector device 110 may be a network device and contain many of the components described above and shown in FIG. 1. However, the reflector device 110 may have a smaller amount of memory and may have less computational ability.

In FIG. 2, the initiator device 10 may transmit a signal, containing a sine wave having a first frequency to the reflector device 110. In response, the reflector device 110 may transmit signal containing a sine wave having the same first frequency toward the initiator device 10.

In certain embodiments, this signal is transmitted using a network protocol, such as Bluetooth.

The initiator device 10 may utilize the I and Q signals described above to determine the amplitude and phase of the signal arriving at the antenna element 35. This information may then be used to calculate the distance from the initiator device 10 to the reflector device 110.

Specifically, the Bluetooth specification now describes a Channel Sounding procedure, during which the initiator device 10 transmits a first signal at a first frequency to the reflector device 110. The reflector device 110 measures the magnitude and phase of the incoming first signal. In response, the reflector device 110 transmits a second signal having the first frequency back to the initiator device 10. The initiator device 10 measures the magnitude and phase of the incoming second signal. This may be repeated for a number of different frequencies. Based on the magnitude and phase information gathered by the initiator device 10 and the reflector device 110, the channel transfer function (H) may be estimated. Note that the term "channel transfer function" is synonymous with "channel frequency response".

As a specific example, the Bluetooth specification defines the following procedure to determine the channel transfer function.

First, $\theta_{CH}$ (f) represents the phase delay of the channel, where f is the channel frequency, and $\Delta\theta_{LO}$ (f) represents the relative difference in phase of the RF carrier between the initiator device and the reflector device. Based on this, the relative phases of a carrier measured at the reflector and initiator's antenna is $\theta_{REFL}$ (f)=$\theta_{CH}$ (f)+$\Delta\theta_{LO}$ (f) and $\theta_{INIT}$ (f)=$\theta_{CH}$ (f)–$\Delta\theta_{LO}$ (f). $A_{REFL}$ (f) and $A_{INIT}$ (f) represent the amplitude of that measured carrier at the reflector and initiator's antenna, respectively. Phase correction term (PCT) is defined by the angle that, if added to the internal angle of the local oscillator, would result in a phase identical to that of the incoming signal. The I and Q values represented by the PCT measured at the reflector and initiator, respectively, are given by $PCT_{REFL}$ (f)=$A_{REFL}$ (f) $e^{i\theta}{}_{REFL}$ (f) and $PCT_{INIT}$ (f)=$A_{INIT}$ (f) $e^{i\theta}{}_{INIT}$ (f). If the communication channel is symmetrical between the initiator device 10 and the reflector device 110, the measured phases are dependent on both the communication channel and the relative difference in phase of the RF carrier between the devices. The communication channel transfer function can then be estimated from $H^2$ (f)=$A_{REFL}$ (f) $e^{i\theta}{}_{REFL}$ (f)×$A_{INIT}$ (f) $e^{i\theta}{}_{INIT}$ (f)=$A_{CH}{}^2$ (f) $e^{i2\theta}{}_{CH}$ (f).

The channel transfer function (also referred to as channel frequency response) may then be used to compute the distance between the initiator device 10 and the reflector device 110.

Specifically, the power of a signal path at a predetermined distance may be estimated by de-rotating the signal path phase from the channel frequency response and assuming that the mean power of all other components will approximate zero.

This can then be used to calculate the power ratio at each distance, x. Specifically, the power ratio may be defined as:

$$\varphi(x) = \frac{P_s(x)}{P_r(x)} = \frac{P_s(x)}{P_H - P_s(x)}$$

where $P_s(x)$ is the trial signal power, $P_r(x)$ is the total remaining signal power and $P_H$ is the total power of the channel frequency response.

Figure 3:
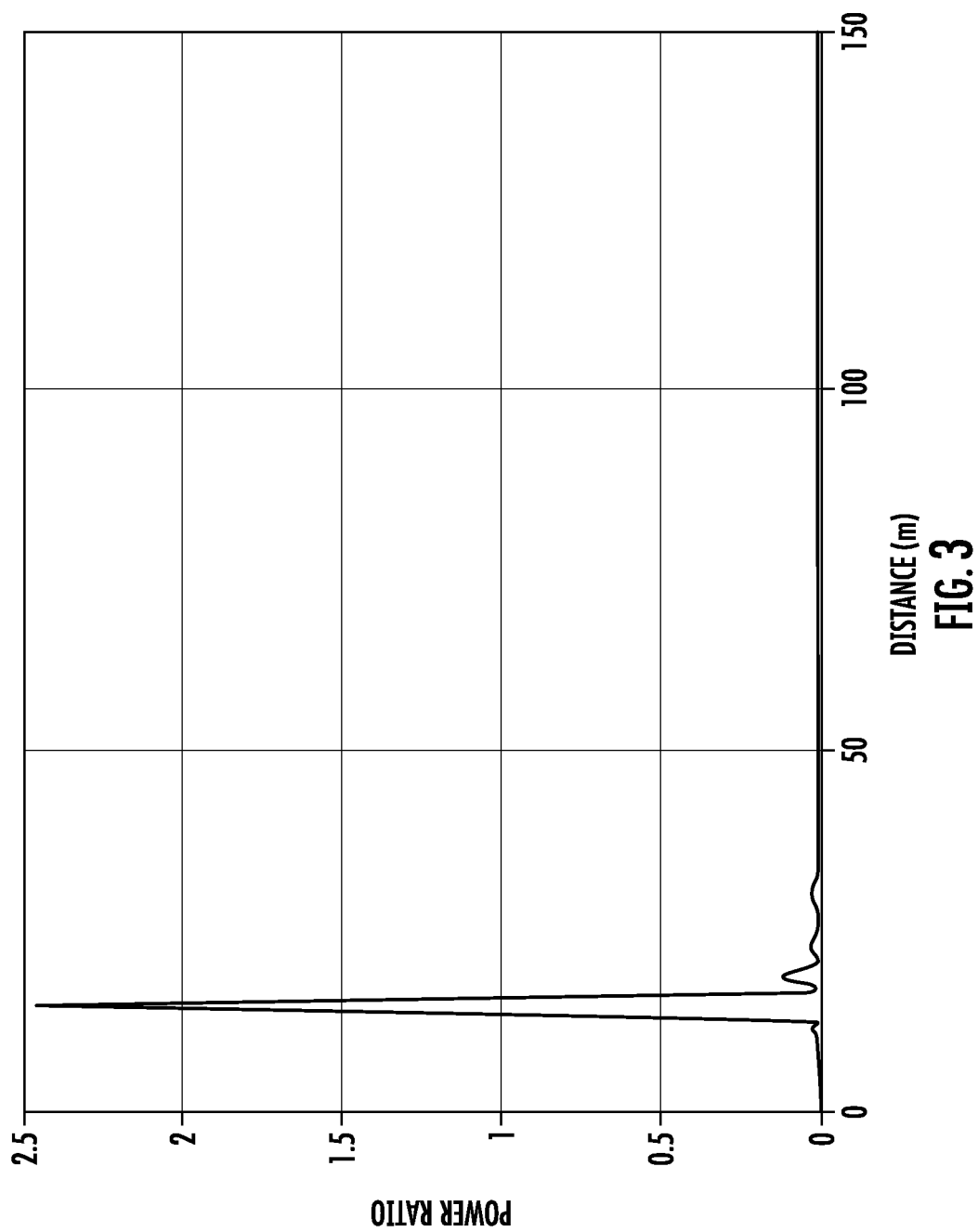
FIG. 3 shows an example graph showing power ratio as a function of distance.

FIG. 3 shows an example spectrum that may be created using this approach. Note that each peak represents a distance at which there is measurable signal power.

The disclosed algorithm creates this spectrum and then assumes that the first peak corresponds to the power received from the line of sight path, since this is the shortest path.

The trial signal power may be computed by de-rotating the signal path phase with the channel frequency response, as stated above. The signal path phase may be defined using a fixed matrix, where the columns of that matrix represent different distances and the rows represent different frequencies. This matrix represents the signal path phase at various distances and frequencies.

Thus, D(f,d) is the signal path phase at frequency f at distance d. The values of frequency used to populate this matrix may be selected to be the same as the frequencies present in the channel frequency response. For example, these frequencies may coincide with the frequencies of the various Bluetooth channels. The distances may represent the desired granularity of the measurement. For example, the distance may be set to large numbers (such as 1 meter) if the device is known to be far away, but may be set to a smaller number, such as 5 cm if the device is closer.

The signal path phase at each location in the matrix may be defined as:

$$D(f,d)=e^{i2\pi fd/c}$$

Further, the trial signal power may be computed by first multiplying the signal path phase by the channel frequency response H to obtain the de-rotated frequency response. H is defined as a N×1 array, wherein N represents the number of frequencies that were used to compute the channel frequency response. Thus, the de-rotated frequency response, represented by V, may be defined as:

$$V=D\otimes H,$$

Where $\otimes$ represents a point-wise multiplication of each element in each column of D with the corresponding element in H. In other words, $$V(f,d)=D(f,d)*H(f)$$

Based on this de-rotated frequency response and the channel frequency response, the power ratio may be computed as follows:

$$\varphi(x) = \frac{\left|\frac{1}{N}\sum_k V(k,x)\right|^2}{\frac{1}{N}\sum_k \left(|H(k)|^2\right) - \left|\frac{1}{N}\sum_k V(k,x)\right|^2}$$

In this equation, $$\left|\frac{1}{N}\sum_k V(k,x)\right|^2$$

approximates the trial signal power over all frequencies at distance x, and $$\frac{1}{N}\sum_k \left(|H(k)|^2\right)$$

represents the total power of the channel frequency response. Thus, the denominator, which subtracts the trial signal power from the total power of the channel frequency response is used to approximate the remaining power.

FIG. 4 shows pseudo code that may be used to determine a distance between two devices. In this example, it is assumed that the channel frequency response has already been determined, as described above.

First, several variables are initialized. These include the maximum distance (max_distance), the distance step size (x_step), the number of frequencies used (H_length), and the starting distance (x_arg). Additionally, since the channel response total power (H_power) does not change, it can be pre-calculated as well.

Next, the pseudo code is used to calculate the signal path phase at each of the frequencies that are included in the channel frequency response. Specifically, for each frequency, the pseudo code determines the frequency using the list ch_list. It then generates the signal path phase using the equation for D shown above. These phase values (one for each frequency) are multiplied by the channel frequency response at that frequency to create the de-rotated frequency response for the trial signal at each frequency.

Once this has been performed for each frequency in the channel list, the power of the trial signal can be calculated as the square of the mean value of the de-rotated frequency response for the trial signal across all frequencies. The power ratio can then be calculated using the expression shown above:

$$\varphi(x) = \frac{\left|\frac{1}{N}\sum_k V(k,x)\right|^2}{\frac{1}{N}\sum_k \left(|H(k)|^2\right) - \left|\frac{1}{N}\sum_k V(k,x)\right|^2}$$

Once the power ratio at a specific distance is determined, the pseudo code can then check if the first peak has been found. In one embodiment, the peak is identified by looking for a power ratio that is smaller than the previous power ratio. This embodiment is shown in FIG. 4. If this power ratio is smaller than the previous one, then the previous distance is saved as the final result. Otherwise, the current power ratio is saved as the previous power ratio and the distance is incremented. This process repeats until the first peak is found. This first peak may be the smallest distance that indicated a non-zero power ratio. Since this is the smallest distance, it is assumed that this is the line of sight distance. In other embodiments, the first peak may be further defined as the smallest distance that indicated a power ratio greater than a predetermined threshold. This threshold could be determined empirically or may be a predetermined value. In some embodiments, the threshold may be set to a value of 0.1 or greater. Thus, in certain embodiments, the threshold is set to zero, which indicates that any non-zero peak may be the first peak. In other embodiments, the threshold may be a non-zero value, such that the first peak is defined as the peak having a magnitude greater than the threshold at the smallest distance.

Note that one advantage of this approach is that the entire spectrum shown in FIG. 3 does not need to be computed to determine the actual distance. Rather, the only calculations performed are those that are at distances that are less than the line of sight distance.

Further, it is noted that the pseudo code in FIG. 4 is only one approach to determine the line of sight distance. For example, a different peak detection algorithm may be used. In another embodiment, the peak may be detected by monitoring the gradient and looking for a change in the polarity of the gradient. Additionally, rather than looping over distances, some statistical or Monte Carlo method may be used to select the distances that are to be checked. Of course, other computational optimization techniques, which are well known, may also be used.

Further, it is understood that the power ratio may be defined differently. For example, the power ratio may be defined as the trial signal power divided by the power of the channel response. Thus, in this embodiment, the denominator of the power ratio is simply the total power of the channel frequency response, rather than the total power of the channel frequency response less trial signal power. In this embodiment, if a threshold is used to determine the first peak, the selected threshold may be lower than that used for the embodiment described earlier. Further, since the total power of the channel frequency response is constant for all measurements, in certain embodiments, the power ratio may simply be the trial signal power divided by a constant, which to simplify operations, may be set to 1.

Note that this computation may be performed by the initiator device 10. The initiator device 10 may contain the requisite computation power and memory space to perform these calculations. Alternatively, the initiator device 10 may off-load the calculations to a computational device (not shown).

The present system has many advantages. First, this method utilizes a small memory footprint, as few values need to be stored. Second, this algorithm is very fast to compute and does not require the computation of eigenvectors, like some other approaches. This approach is also accurate. In one test, two devices were separated by a known amount and the disclosed approach was used to calculate the distance between the devices. This computed distance was then compared to the actual distance. Measurement were taken at distances in the range of 0.5 meters to 20 meters. For almost all measurements, the difference between the actual distance and the calculated distance, referred to as distance error is less than 1 meter.

Additionally, this method can be used with a sparse channel frequency response. In many embodiments, there are several Bluetooth channels that are reserved for advertisements, and therefore should not be used for distance measurements. The present approach allows the channel frequency response to be created using as many or as few channels as desired. For example, in some embodiments, the channel frequency response may be calculated without using any of the advertising channels. The test described above was repeated where the channel frequency response was generated using fewer frequencies. There was little change in the distance error, even with fewer frequencies.

Figure 5:
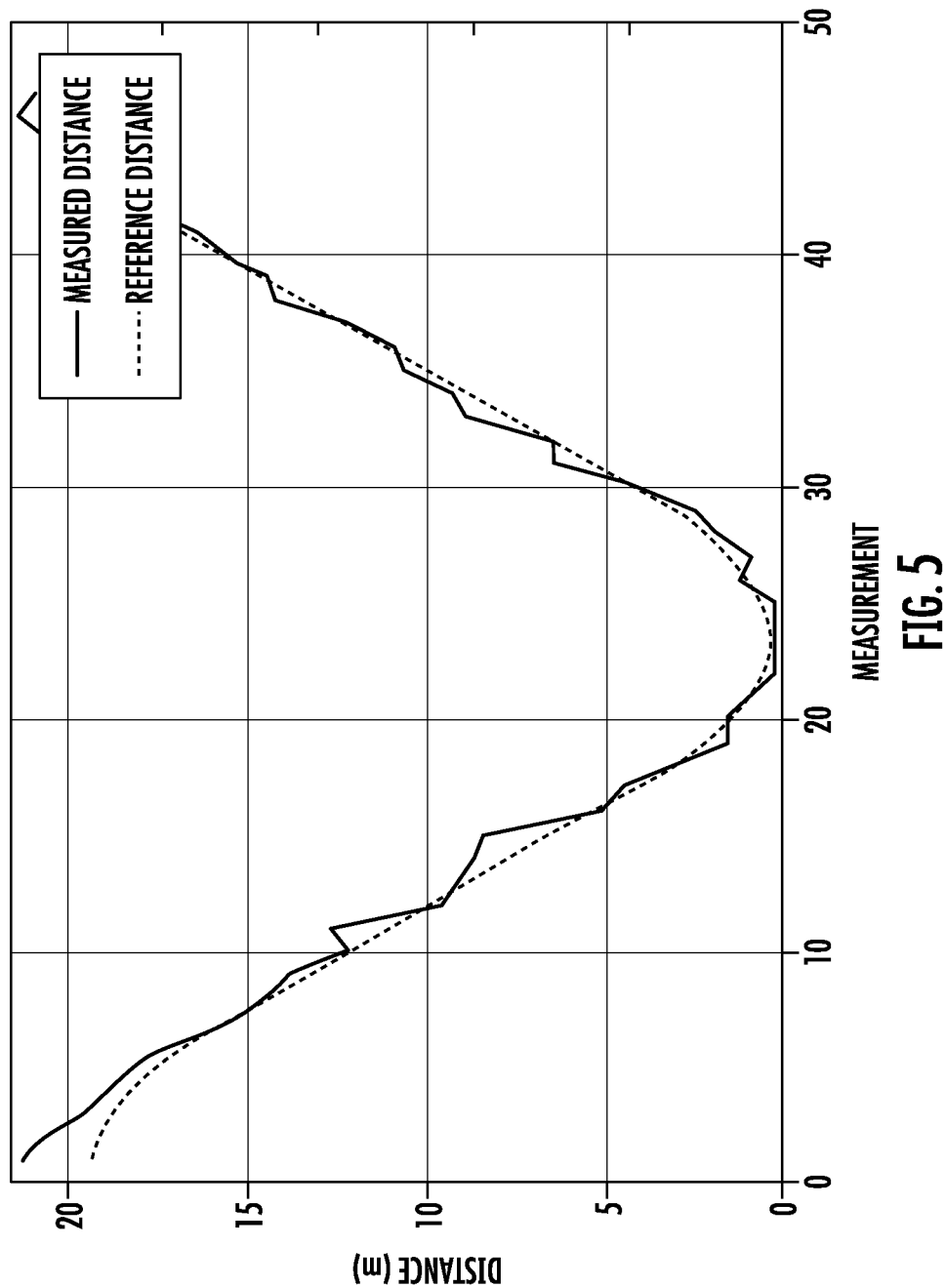
FIG. 5 shows a graph that shows the distance measured when the reflector device is moving.

As noted above, this approach is not compute intensive. Consequently, the results may be obtained fairly quickly. This allows another benefit, which is the ability to track moving targets. FIG. 5 shows the results when a stationary initiator device is used with a moving reflector device. In this configuration, the reflector device is initially 20 meters from the initiator device and moves toward the initiator device at a rate of 1.4 m/s. The dotted line shows the actual distance at the time of the measurement, while the solid line shows the measured distance. Note that even with the reflector device in motion, the algorithm is able to track its distance with little error.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of calculating a distance between two wireless network devices, comprising:
    performing a Channel Sounding procedure at a plurality of frequencies to obtain a channel frequency response;
    using the channel frequency response to generate a power ratio as a function of distance, wherein power ratio is defined as trial signal power divided by remaining power; and
    identifying a first peak in the power ratio, wherein the first peak corresponds to the distance between the two wireless network devices.

2. The method of claim 1, wherein the remaining power is calculated by subtracting the trial signal power at a first distance from a power of the channel frequency response.

3. The method of claim 2, wherein the trial signal power at the first distance is first calculated by de-rotating a phase of the signal path at the first distance from the channel frequency response to obtain a de-rotated frequency response.

4. The method of claim 3, wherein the trial signal power at the first distance is computed by squaring an absolute mean value of the de-rotated frequency response at the plurality of frequencies.

5. The method of claim 2, wherein the power of the channel frequency response is calculated as a mean of an absolute value of the channel frequency response at each of the plurality of frequencies, squared.

6. The method of claim 1, wherein the two wireless network devices comprise Bluetooth network devices.

7. The method of claim 6, wherein the plurality of frequencies comprise all frequencies associated with Bluetooth channels or the plurality of frequencies comprise all frequencies associated with Bluetooth channels, except advertising channels.

8. The method of claim 1, wherein the power ratio is calculated at a plurality of distances and the first peak is defined as a peak having a magnitude greater than a threshold at a smallest distance.

9. A Bluetooth network, comprising:
    a reflector device; and
    an initiator device, comprising:
        a Bluetooth network interface;
        a processing unit; and
        a memory device, wherein the memory device comprises instructions, which when executed by the processing unit, enable the initiator device to:
            calculate a channel frequency response at a plurality of frequencies;
            use the channel frequency response to generate a power ratio as a function of distance, wherein power ratio is defined as trial signal power divided by remaining power; and
            identify a distance between the reflector device and the initiator device by identifying a first peak in the power ratio, wherein the first peak corresponds to the distance between the reflector device and the initiator device.

10. The Bluetooth network of claim 9, wherein the remaining power is calculated by the initiator device by subtracting the trial signal power at a first distance from a power of the channel frequency response.

11. The Bluetooth network of claim 10, wherein the trial signal power at the first distance is first calculated by the initiator device by de-rotating a phase of the signal path at the first distance from the channel frequency response to obtain a de-rotated frequency response.

12. The Bluetooth network of claim 11, wherein the trial signal power at the first distance is computed by the initiator device by squaring a mean value of the de-rotated frequency response at the plurality of frequencies.

13. The Bluetooth network of claim 10, wherein the power of the channel frequency response is calculated by the initiator device as a mean of an absolute value of the channel frequency response at each of the plurality of frequencies, squared.

14. The Bluetooth network of claim 9, wherein the plurality of frequencies comprise all frequencies associated with Bluetooth channels or wherein the plurality of frequencies comprise all frequencies associated with Bluetooth channels, except advertising channels.

15. The Bluetooth network of claim 9, wherein the initiator device calculates the power ratio at a plurality of distances and the first peak is defined as a peak having a magnitude greater than a threshold at a smallest distance.

16. A method of calculating a distance between two wireless network devices, comprising:
    performing a Channel Sounding procedure at a plurality of frequencies to obtain a channel frequency response;
    using the channel frequency response to generate a power ratio as a function of distance, wherein power ratio is defined as trial signal power divided by a constant; and
    identifying a first peak in the power ratio, wherein the first peak corresponds to the distance between the two wireless network devices.

17. The method of claim 16, wherein the trial signal power at a first distance is first calculated by de-rotating a phase of the signal path at the first distance from the channel frequency response to obtain a de-rotated frequency response, and then squaring an absolute mean value of the de-rotated frequency response at the plurality of frequencies.

18. The method of claim 16, wherein the constant is the power of the channel frequency response, and wherein the power of the channel frequency response is calculated as a mean of an absolute value of the channel frequency response at each of the plurality of frequencies, squared.

19. The method of claim 16, wherein the constant is 1.

20. The method of claim 16, wherein the power ratio is calculated at a plurality of distances and the first peak is defined as a peak having a magnitude greater than a threshold at a smallest distance.

\* \* \* \* \*